367-93 SR

3/22/88 OR 4,733,381

United States Patent [19]

Farmer et al.

[11] Patent Number: 4,733,381

[45] Date of Patent: Mar. 22, 1988

[54] AUTOMATIC LEVEL SENSING SYSTEM

[76] Inventors: M. Zane Farmer; Diane B. Farmer, both of 12 Christman Tree Dr., Ashburnham, Mass. 01430

[21] Appl. No.: 735,547

[22] Filed: May 20, 1985

Related U.S. Application Data

[62] Division of Ser. No. 632,375, Jul. 19, 1984.

[51] Int. Cl.[4] .............................................. G01S 15/02

[52] U.S. Cl. ........................................ 367/93; 141/94; 141/198; 364/465; 377/6

[58] Field of Search ........................ 367/93; 377/6, 13; 141/94, 198; 364/465, 477

[56] References Cited

U.S. PATENT DOCUMENTS

| | | | |
|---|---|---|---|
| 3,431,550 | 3/1969 | Spence | 367/93 |
| 4,202,387 | 5/1980 | Upton | 141/94 |
| 4,236,553 | 12/1980 | Reichenberger | 141/198 |
| 4,437,497 | 3/1984 | Enander | 141/198 |
| 4,440,200 | 4/1984 | De Vale et al. | 141/95 |
| 4,559,979 | 12/1985 | Koblasz et al. | 141/198 |

*Primary Examiner*—Glen R. Swann, III

*Attorney, Agent, or Firm*—Joseph S. Iandiorio; William E. Noonan

[57] ABSTRACT

A receptacle counting system includes an ultrasonic sound wave transducer for emitting ultrasonic sound waves and for receiving ultrasonic sound waves reflected from a receptacle whose contact level is to be sensed. There is a rim detector, responsive to the reflected ultrasonic sound waves, for determining the location of the rim of the receptacle and a receptacle detector, responsive to the rim detector, for indicating when a receptacle is present. One or more counters, responsive to the receptacle detector, are provided for monitoring the number of receptacles presented to the system.

5 Claims, 5 Drawing Figures

AUTOMATIC LEVEL SENSING SYSTEM

This is a division, of application Ser. No. 632,375, filed July 9, 1984.

FIELD OF INVENTION

This invention relates to an automatic level sensing system, and more particularly to one which is adapted for use in a dispensing system for completely automatically filling a receptacle precisely without spillage or human intervention.

BACKGROUND OF INVENTION

Conventional beverage dispensers such as used in restaurants and fast food facilities use a flow rate approach to dispense the liquid. Typically such dispensers use a timer to control the length of time that the fluid is permitted to flow into a cup or other receptacle of known capacity. For dispensers used with more than one size cup, button switches labelled "small", "medium" and "large" are provided to be actuated by the server to set the timer to the flow period to fill the particular size cup. Various problems arise with these mechanisms. When the pressure decreases, such as when the carbonating $CO_2$ tank runs low, the flow also decreases, causing less than the correct amount to be delivered. When these timers are set for each cup size there is taken into account the typical amount of ice, if any, to be used. If the volume of ice varies from the typical amount, the cup will overflow or underfill, either wasting the beverage or requiring a manual override to complete the filling. These dispensers must run slowly enough to avoid excess foam. If foaming does occur there may be wasteful overflow, delays in service, and the need for one or more cycles of manual override to properly top-up the cup. Ever present is the simple problem of the server hitting the the wrong size indicator button, which causes underflow or overfill with consequent delays, waste and wet, messy cups for the customer.

Attempts to more fully automate these dispensers, such as by using photoelectric devices, do not compensate for ice level, foam or flow rate, but such devices can be made to determine the size of the cup to be filled. However, photoelectric devices do suffer from alignment problems and environmental contamination. Mechanical probes have similar problems regarding distinguishing between different size cups and foam buildup. Mechanical probes also tend to be broken, interfere with the insertion and removal of the cup, and are difficult to keep clean. Capacitive proximity devices suffer from similar problems and the sensor portion must be properly located for each different size cup. Weighing devices also must know what size cup is placed on them and must distinguish between different amounts of ice initially in the cup, and are susceptible to errors due to jostling and vibrations.

SUMMARY OF INVENTION

It is therefore an object of this invention to provide an improved automatic level sensing system.

It is a further object of this invention to provide such a level sensing system which may be used in a dispensing system.

It is a further object of this invention to provide such a dispensing system which operates without need to recognize cup size in order to fill the cup to the proper level.

It is a further object of this invention to provide such a dispensing system which in dispensing a liquid fills the cup to the proper level regardless of how much or how little ice is already present in the cup.

It is a further object of this invention to provide such a dispensing system which in dispensing a liquid fills the cup to the proper level even though there may occur foaming of the beverage or liquid.

It is a further object of this invention to provide such a dispensing system in which changing the size or shape of the cups or other receptacles does not require recalibration of the filling flow.

It is a further object of this invention to provide such a dispensing system which fills every receptacle to the proper level regardless of the size.

It is a further object of this invention to provide such a dispensing system which does not rely on flow rate and is therefore unaffected by changes in the flow rate of the filling of the receptacle.

It is a further object of this invention to provide such a dispensing system in which there is increased freedom from human error because there are no switches that might be erroneously operated to start or stop the filling or indicate the size of cup to be filled.

The invention results from the realization that a truly effective level sensing system can be made to operate independent of flow rate or receptacle size to accurately, reliably fill or empty a receptacle of any size without human intervention by using ultrasonic echo ranging to find and compare the rim and content level of a receptacle and maintain flow into or out of the receptacle until the content level is a predetermined distance from the rim. More specifically, a truly automatic dispenser system can be made to properly fill cups of unknown size by using ultrasonic sound waves to compare the liquid level in the cup with the rim location of the cup until the two are within a predetermined distance.

This invention features a level sensing system including ultrasonic sound wave transducer means for emitting ultrasonic sound waves and for receiving ultrasonic sound waves reflected from a receptacle whose content level is to be sensed. There is a content level detector responsive to the reflected ultrasonic sound waves for determining the level of the contents of the receptacle, and there is a rim detector responsive to the reflected ultrasonic sound waves for determining the location of the rim of the receptacle. A level comparator responsive to both the rim detector and the content level detector, compares the content level with the rim location and indicates when the level of the contents and the rim location are within a predetermined distance of each other.

In a preferred embodiment there is a receptacle detector responsive to the rim detector for indicating when a receptacle is present, and a flow valve may be provided responsive to the receptacle detector for controlling the level of the contents of the receptacle. The transducer means may, include a transducer and means for providing a periodic burst of ultrasonic signal to the transducer. Also included in the transducer means may be means for detecting the reflected ultrasonic sound waves above a preselected level.

The content level detector may include a content detector circuit and a content counter enabled to count coincidentally with the burst of ultrasonic signal, and disabled by the content detector circuit upon detecting a first level. The rim detector may include a rim detector circuit and a rim counter enabled to count coincidentally with the occurrence of the burst of ultrasonic signal, and disabled by the rim detector circuit upon the detection of a second level. The receptacle detector may include means for counting the number of times within a preset period that a receptacle rim is detected. The level comparator may include a comparator circuit for indicating when the count in the content counter is within a predetermined range of the count in the rim counter.

There may be means for monitoring the number of receptacles presented to the system. Such means for monitoring may include a reference plane a fixed distance from the transducer means for supporting the receptacle, and a decoder circuit responsive to the rim counter and the receptacle detector indicates the size of the receptacle present, and there are means for counting the number of each different size of receptacle which is indicated by the decoder circuit. The receptacle detector actuates the flow valve when a receptacle is present. The level of the contents in the receptacle may be increasing and opens the flow valve.

The level sensing system may be used in a dispenser system according to this invention including ultrasonic sound wave transducer means for emitting ultrasonic sound waves and for receiving ultrasonic sound waves reflected from a receptacle to be filled. There is a fill level detector responsive to the reflected ultrasonic sound waves for determining the fill level of the receptacle, and a rim detector responsive to the reflected ultrasonic sound waves for detecting the location of the rim of the receptacle. There is a flow valve for filling the receptacle and a receptacle detector responsive to the rim detector for opening the flow valve when a receptacle is present and permitting flow into the receptacle. A level comparator is responsive to the rim detector and the fill level detector for comparing the fill level with the rim location, and closing the flow valve when the receptacle is filled to within a predetermined distance of the rim location.

In a preferred embodiment the transducer means may include a transducer and means for providing a periodic burst of ultrasonic signal to the transducer as well as means for detecting reflected ultrasonic sound waves above a preselected level sensed by the transducer. The fill level detector may include a fill detector circuit and a fill counter enabled to count coincidentally with the occurrence of a burst of ultrasonic signal, and disabled by the fill detector circuit upon detection of the filled level. The rim detector includes a rim detector circuit and a rim counter enabled to count coincidentally with the occurrence of the burst of ultrasonic signal and disabled by the rim detector circuit upon detection of the rim level. The receptacle detector may include means for counting the number of times within a preset period that a receptacle rim is detected The level comparator may include a comparator circuit for indicating when the count in the fill counter is within a predetermined range of the count in the rim counter.

The invention also features a receptacle counting system for counting the number of cups or receptacles which are presented to the system. There is an ultrasonic sound wave transducer means for emitting ultrasonic sound waves and for receiving ultrasonic sound waves reflected from a receptacle whose content level is to be sensed. A rim detector responsive to the reflected ultrasonic sound waves determines the location of the rim of the receptacle. A receptacle detector responsive to the rim detector indicates when the receptacle is present, and there are means, responsive to the receptacle detector, for monitoring the number of receptacles presented to the system.

The monitoring means may include means for fixing the distance between the base of the receptacle and the transducer means, and a decoder circuit responsive to the rim counter and the receptacle detector for indicating the size of the receptacle present. The rim detector may include a rim detector circuit and a rim counter enabled to count coincidentally with the occurrence of the burst of ultrasonic signals, and disabled by the rim detector circuit upon detection of the rim location The means for monitoring may also include means for counting each different size receptacle indicated by the decoder circuit.

BRIEF DESCRIPTION OF THE DRAWINGS

Other objects, features and advantages will result from the following description of a preferred embodiment and the accompanying drawings, in which.

DESCRIPTION OF THE PREFERRED EMBODIMENT

The invention may be accomplished with a level sensing system using an ultrasonic sound wave transducer for emitting ultrasonic sound waves and for receiving ultrasonic sound waves reflected from a receptacle whose content level is to be sensed. The transducer means may include an ultrasonic transducer in conjunction with some means for providing a burst of ultrasonic energy to the transducer to send out a burst of ultrasonic sound waves, and an echo detecting circuit which detects meaningful levels of sound waves which have been reflected back and detected by the transducer. A content level detector uses the reflected ultrasonic sound waves to determine the level of the contents of the receptacle. If the receptacle is empty, the level will be at the base; otherwise, the level will be somewhere between the base and the rim. A rim detector, which also responds to reflected ultrasonic sound waves, determines the location of the rim of the receptacle, and a level comparator responds to both the rim detector and the content level detector to compare the contents level with the rim location and indicate when the contents are within a predetermined distance of the rim. The receptacle may be being filled or emptied, that is the contents may be rising or lowering, respectively, and the contents may be any material that can be poured or drawn off, such as liquids, powders, flakes and the like.

The level sensing system may include a receptacle detector, which uses the rim detector to determine when a receptacle is present, and there may be a flow valve responsive to the receptacle detector indicating that a receptacle is present, for controlling the level of the contents of the receptacle.

The level sensor of this invention may be used to locate the near and far edge of an object, or the level sensor may be moved about relative to two planes of reference to find the near and far edge in two dimensions and thereby determine the size and shape of an object; or two or more such sensors may be used in a stationary mode. Presently the most interesting application of the level sensing system is its use in a dispenser system or a beverage dispensing system to monitor the level of beverage in a cup being filled and turn off the flow when the level has reached a predetermined height with respect to the top or rim of the cup.

Figure 1:
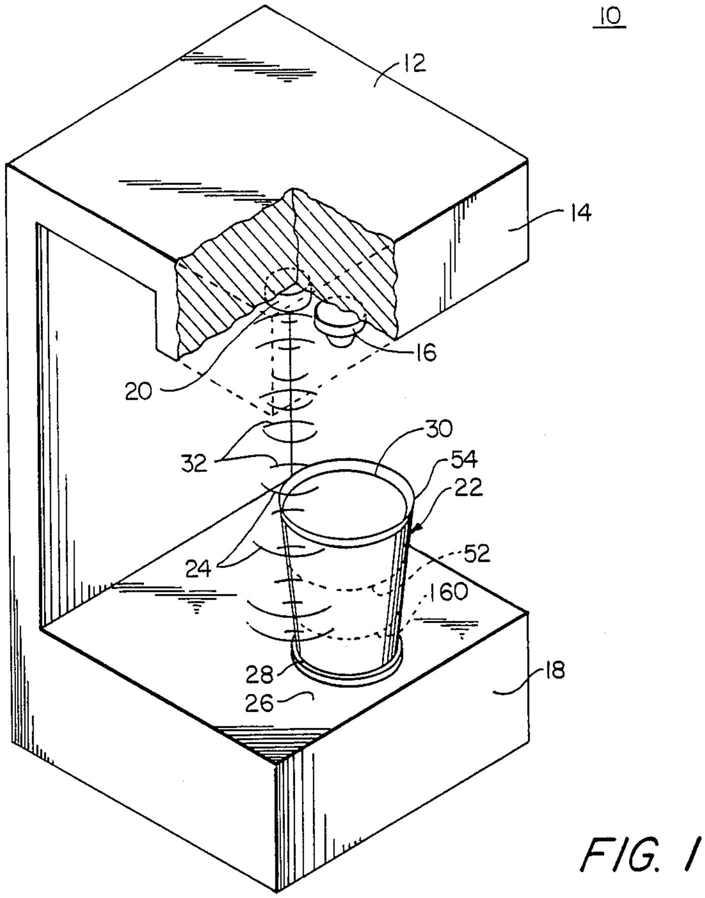
FIG. 1 is a diagrammatic elevational view of a dispenser system according to this invention.

A beverage dispensing system 10 according to this invention is used with a conventional beverage dispenser unit 12, FIG. 1, including head 14 and flow valve 16 in conjunction with an ultrasonic transducer 20 which is a part of system 10 according to this invention. A cup 22 of any size may be placed on base 18 beneath head 14 and flow valve 16. A burst of ultrasonic sound waves indicated by the outwardly convex wave fronts 24 are emitted by transducer 20 and reflect off the platform 26 of base 18, the base 28 of cup 22 and the rim 30 of cup 22, and return to transducer 20 as the convex returning wave fronts 32. The electronic circuitry which drives transducer 20 and responds to the reflected waves received by transducer 20 to operate flow valve 16, may be contained in head 14 and is shown in greater detail in FIG. 2.

Ultrasonic burst circuit 40 periodically drives transducer 20 to emit ultrasonic sound waves 24. The reflected sound waves 32 received by transducer 20 are processed by echo detector circuit 42, which detects peaks in the returning signal indicative of targets encountered by the ultrasonic sound waves. Clock 44 is used to time periodic bursts from ultrasonic burst circuit 40 and blank echo detector circuit 42 during transmissions but enable it during the return of the reflected ultrasonic sound waves. Clock 44 also controls the operation of content level detector circuit 46 and rim level detector circuit 48. Incoming signals indicative of the beverage level in cup 22 are processed by content level detector circuit 46, while those indicative of the location of the rim 30 of cup 22 are processed by rim level detector circuit 48. The outputs of circuits 46 and 48 are compared by comparator circuit 50, which provides an output signal when the fill level has reached within a predetermined distance of the rim. For example, cup 22 may be in the process of filling, and presently be filled to the level 52 on its way to the filled state at level 54. When the level comparator circuit 50 indicates that the beverage has reached level 54, which is within a predetermined distance of rim 30, it may send a signal over a line extending from level comparator circuit 50 to flow valve 16 to turn off flow valve 16 and stop the flow of beverage into cup 22. The flow may have been begun by a switch tripped by the server, or by the waitress, or by some other means. Preferably in this invention the tripping is done automatically, using presence detector circuit 60, which is also synchronized with the circuit by clock 44 and responds to the rim level detector circuit 48 to recognize the presence of a cup in position when the rim level detector circuit detects the rim of such a cup. At that point, presence detector circuit 60 will provide a signal over line 62 to turn on flow valve 16 and cause beverage to flow into cup 22. Then subsequently, when level comparator 50 ascertains that cup 22 is filled, it will provide a signal over line 64 directly to presence detector circuit 60 to turn off flow valve 16.

Another feature which may be added is an inventory control using cup count circuit 70. Cup count circuit 70 responds to rim detection by rim level detector circuit 48, and the output of presence detector circuit 60 to register that a cup has been used. In this way the total number of cups used in a system may be monitored and used for inventory control purposes. System 10 may be implemented as shown in system **10*a*, FIG. 3, where transducer 20 employs a transducer 20*a* such as a Polaroid ultrasonic transducer available from Polaroid Corporation of Cambridge, Mass. Ultrasonic burst circuit 40*a* includes transducer driver 80 driven periodically by an ultrasonic signal from 60 KHz oscillator 82 through burst gate 84 operated periodically, e.g. sixty times per second, by strobe oscillator 86 in clock 44*a*, which operates at 60 Hz per second to produce the outgoing wave fronts 24, FIG. 2. Incoming wave fronts 32 are received by transducer 20*a* and submitted to echo detector circuit 42*a*, which includes a burst amplifier input which amplifies the reflected bursts and submits them to peak detector 90. Peak detector 90 is blanked by blanking circuit 92 under control of strobe oscillator 86 during the operation of burst gate 84, when transducer 20*a* is being operated to transmit a burst of ultrasonic energy, as indicated by wave fronts 24. Peaks of the reflected energy above a certain level are detected by peak detector 90. The lower range of signals are submitted to low amplitude detector 94 in rim level detector circuit 48*a*. The higher level signals are received by high amplitude detector 96 and content level detector circuit 46*a*. Content counter or fill counter 98 in content level detector circuit 46*a*, and rim counter 100 in rim level detector circuit 48*a*, are both enabled to count by a signal on line 102 from strobe oscillator 86 in clock circuit 44*a* when a burst of ultrasonic signal is provided to transducer 20*a*. Counter 98 stops counting when high amplitude detector 96 detects a high signal, and counter 100 stops counting when low-amplitude detector 94 detects the first low amplitude signal. At that time the counts in counters 98 and 100 are compared by digital comparator 106 in level comparator circuit 50*a*. If the two counts have come within a predetermined range of one another, indicating that the cup level represented by the count in counter 98 is within a predetermined distance of the rim of the cup represented by the count in counter 100, then a signal is provided on line 64*a* to presence detector circuit 60*a* to turn off flow valve 16*a* and stop the flow of the beverage into cup 22. Flow valve 16*a* has been previously turned on by the system with a signal on line 108 from strobe oscillator 86 at the time when the burst of ultrasonic energy is provided to transducer 20*a*. This operates one-shot circuit 110, which is set to trigger after a predetermined period of time. During that period of time one-shot circuit 110 holds open gate 112. If during that period of time low-amplitude detector 94 recognizes a reflected signal indicative of the rim of a cup, it gates that signal through to delay counter 114 When a rim of a cup has been seen a predetermined number of times, for example five, and the accumulated count in delay counter 114 reaches the number five, flow valve 16*a* is turned on. In this way the system is sure that it has seen a cup in place before it opens flow valve 16a to fill the cup. Later, when the level content of the cup reaches within the predetermined range of the rim as indicated by digital comparator 106, flow valve 16a is turned off. As soon as the foam subsides the system will continue to see a low level of liquid in the cup and will once again resume operation to complete the filling, until at last the beverage level in the cup is up to the proper height with respect to the rim. Whether the cup is initially filled with ice is immaterial to the operation of the system, for the flow valve will remain open and continue to pour beverage into the cup until the liquid level reaches the proper height. The operation of this will be understood more easily with reference to the timing chart of certain signals that occur in system 10a after the following brief explanation of cup count circuit 70a**.

Since system 10a may fill cups of various sizes to a prescribed height, a number of different size cups may be used with the system without any requirement for the user to indicate what size cup is in the machine at a particular moment. However, it is useful to keep track of the number of cups of each size that are used for the machine. For this reason cup count circut 70a, FIG. 3, includes a gate 120, which is opened when flow valve 16a is operated to pass to decoder circuit 122 the number then present in rim counter 100. This count represents the distance between the platform 26 or bottom of the cup 28, and the rim 30 of the cup, thereby giving a measurement of the size of the cup. Depending upon the count received, decoder circuit 122 then classifies the cup detected as either small, medium or large and increments the small counter 124, medium counter 126, or large counter 128, accordingly.

Figure 2:
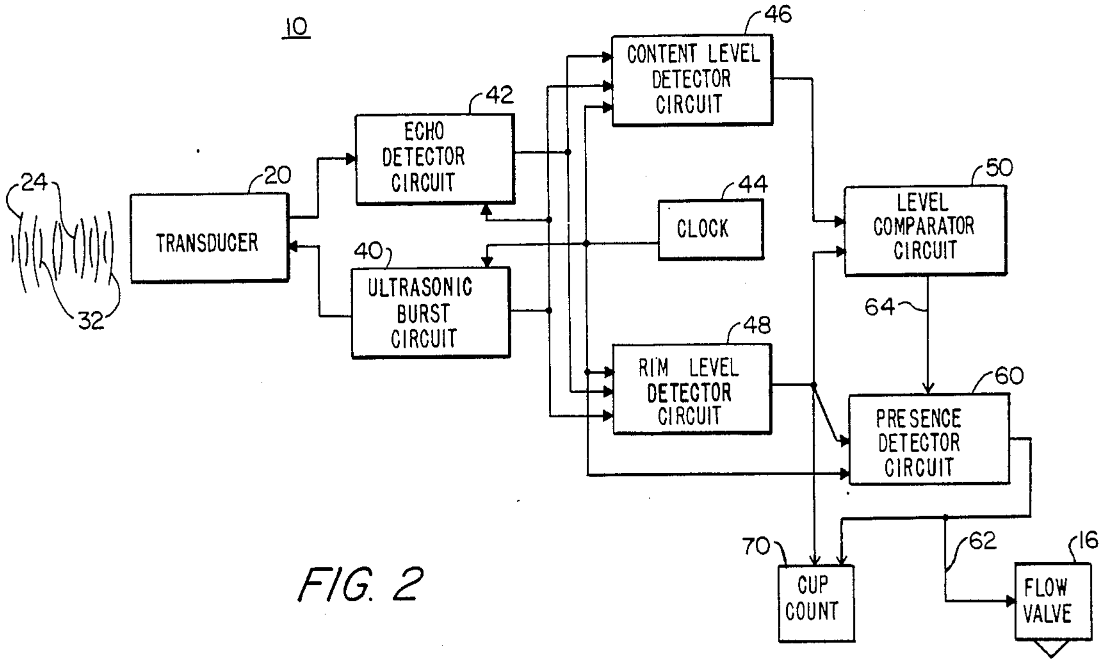
FIG. 2 is a block diagram of a level sensing system according to this invention that may be used in the dispensing system of FIG. 1.
Figure 4:
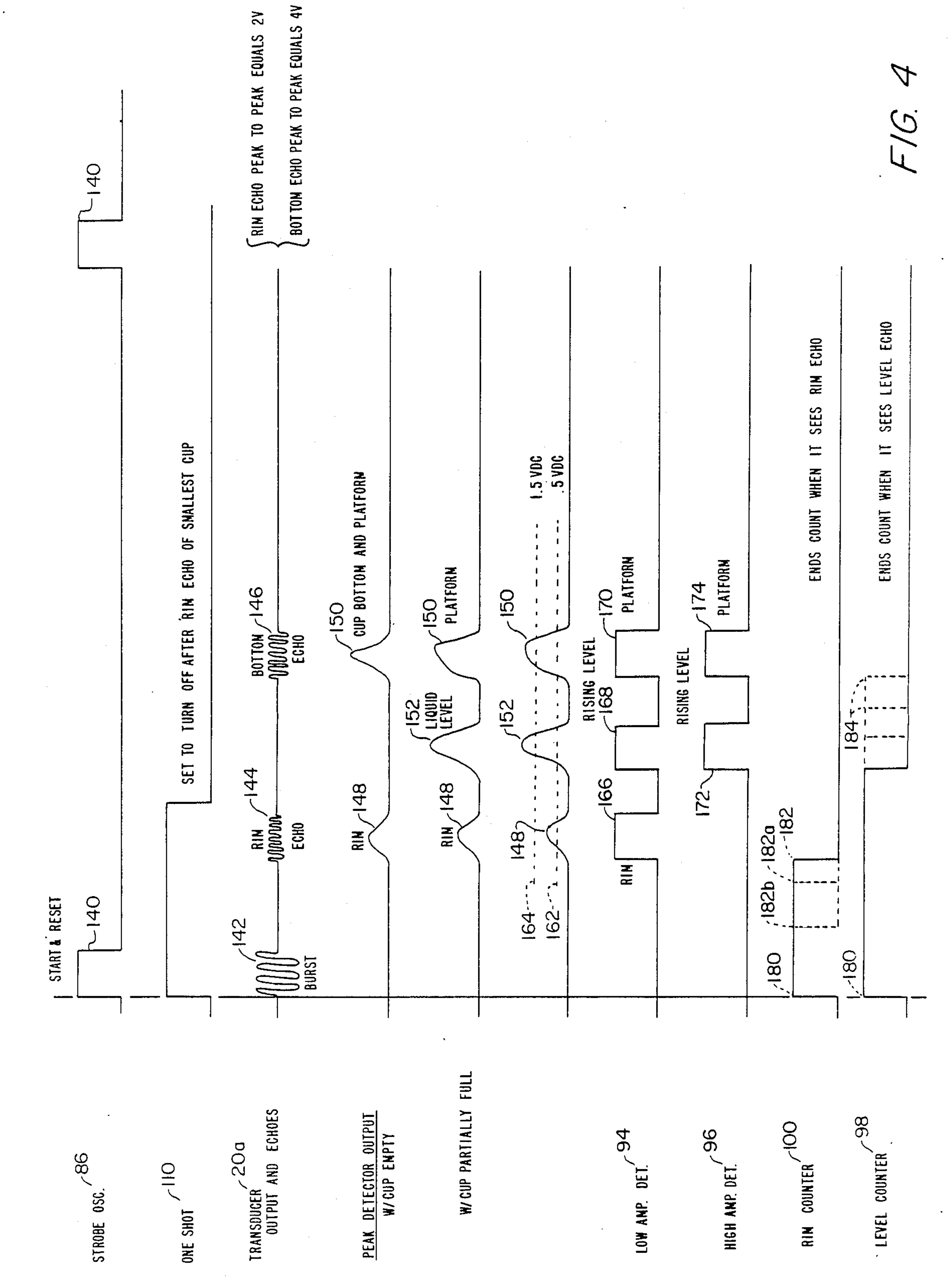
FIG. 4 is a timing diagram showing the relationship of various signals that occur in the system of FIG. 3.

The operation of system 10a may be better understood with reference to the timing diagrams in FIG. 4. Strobe oscillator 86 begins operation by providing a start and reset pulse 140 once every sixty seconds. The pulse provided to burst gate 84 is a start pulse; the pulse provided to blanking circuit 92, one-shot 110, and counters 98 and 100, is considered a reset pulse; but they are all the same pulse 140. Following this, transducer 20a provides a burst of ultrasonic energy 142 at 60 KHz. During this period peak detector 90 is blanked, and shortly thereafter, when it is unblanked, it detects a first echo 144 from the top or rim 30 of cup 22, and a short time later from a signal 146 from base 26 or the bottom 28 of an empty cup. The peak detector responds to signals 144 and 146 by providing a first peak 148 indicating the cup rim and a second peak 150 representing the bottom 28 of cup 22 or the base 26 of platform 18. In the event that cup 22 is already filled to some intermediate level 160, FIG. 1, with ice or beverage, then rim 148 will be seen as usual and cup base or platform 150 will also be seen; but a third peak 152 will also be seen representing the raised level and the cup. As the cup continues to fill this peak 152 moves away from peak 150 representing the base, and closer to peak 148 representing the rim. Low amplitude detector 94 digitizes all signals above level 162 and high amplitude detector 96 digitizes all signals above level 164. In the construction of FIG. 2, therefore, low amplitude detector 94 provides three digital signals 166, 168, and 170, only the first of which 166 is required to turn off counter 100. High amplitude detector 96 provides only two digitized signals 172 and 174, the first of which 172 is sufficient to turn off counter 98. Thus counter 100 begins counting at 180 and stops counting at 182 when it sees the rim of a small cup. If there were a medium cup in place, then the rim of the cup would be higher and so the counter would count only to point 182a, and if a large cup were in place the count to the rim would be even shorter and would occur at 182b.

As the fill level or content level of cup 22 rises toward rim 30, the count in counter 100 decreases until it reaches count level 184 which is within a predetermined distance of count level 182 of counter 100. At this point digital comparator 106 senses that the level is within the proper distance of rim 30 and sends a signal over line 64a to delay counter 114 to turn off flow valve 16a and end the filling operation. A new count 184 is produced each time the system is cycled by start/reset pulse 140', and since there are sixty such pulses each second, the rising level in cup 22 is monitored very closely with the level being watched sixty times a second until the count reaches level 184, whereupon the flow is ceased. In a typical dispenser the base of the cup is positioned at 78 counts and the rim of the small, medium and large cups are at 45 counts, 41 counts and 25 counts, respectively.

One-shot circuit 110 turns on with start and reset pulse 140, and is set to turn off after the echo from the smallest expected cup to be sure that cups of all sizes will be recognized, counted, if appropriate, and filled when they are present.

Figure 3:
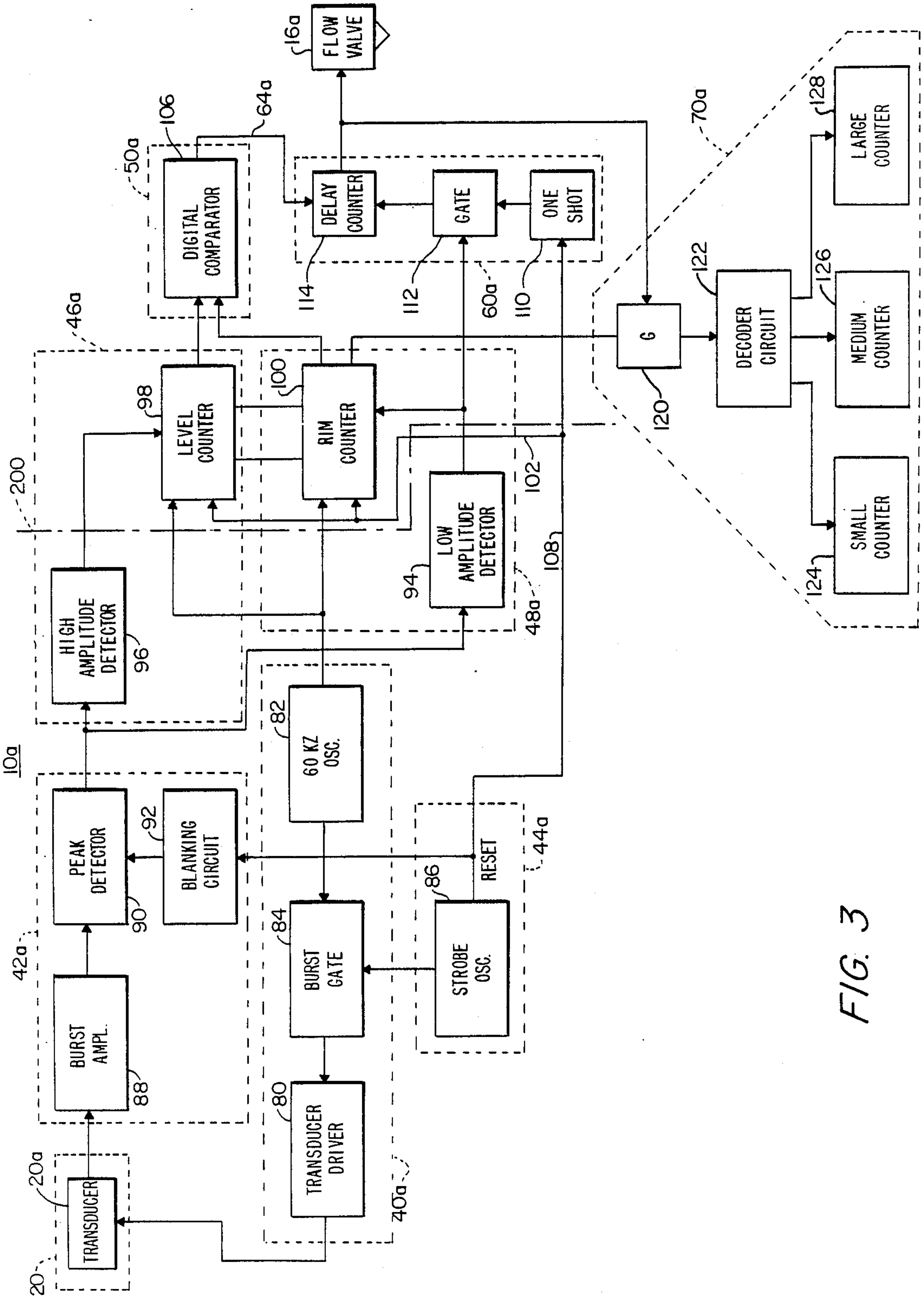
FIG. 3 is a more detailed block diagram of the level sensing system of FIG. 2 adapted for use in the dispenser system of FIG. 1.
Figure 5:
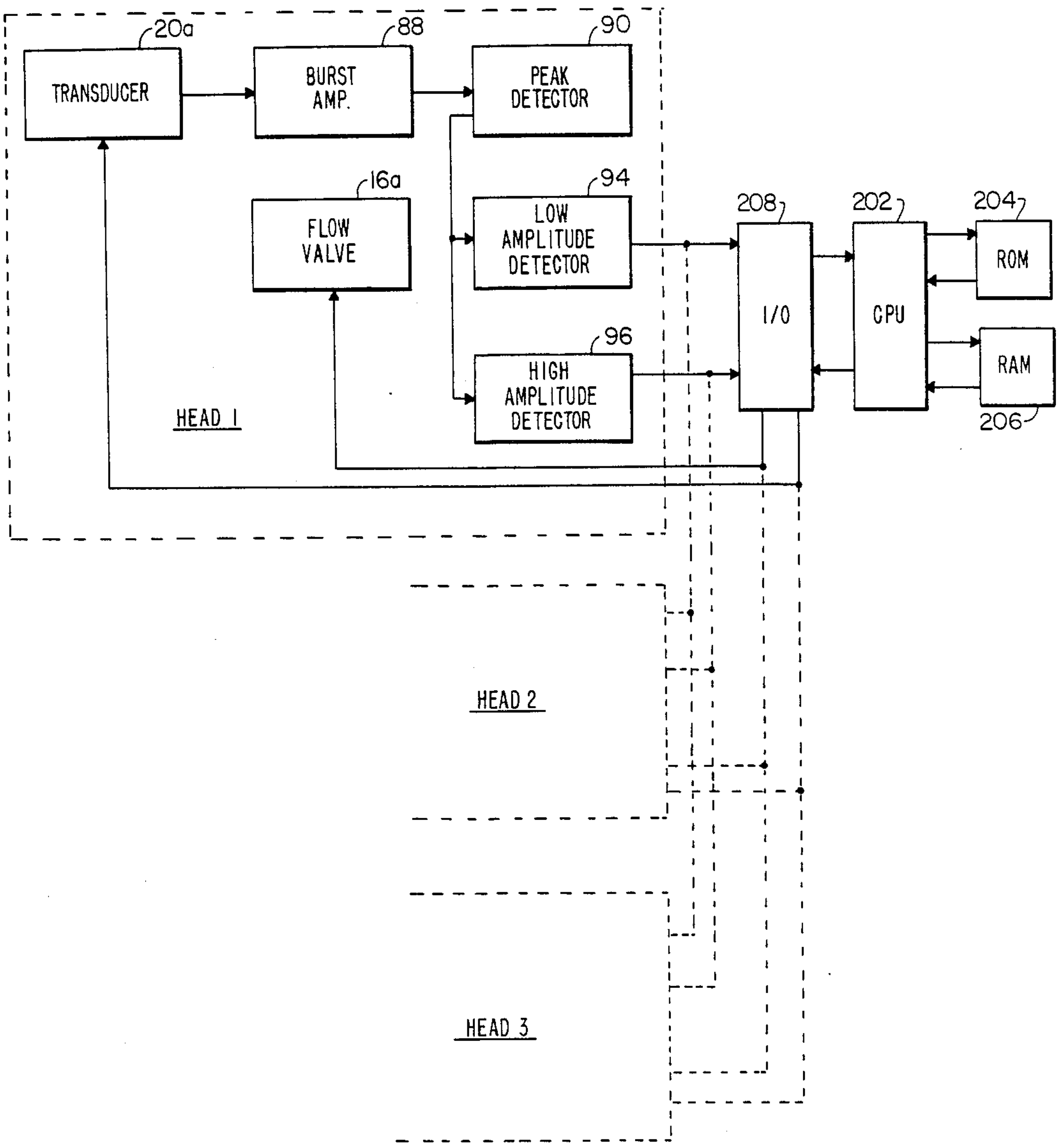
FIG. 5 is a block diagram of a multihead microprocessor-driven dispenser system according to this invention.

The portion to the right of dashed line 200 in FIG. 3 is digital circuitry and may be implemented with a conventional microprocessor including a CPU 202, FIG. 5, with suitable ROM 204, RAM 206, and I/O circuits 208. The digital portion is then time-shared among a number of heads, head 1, head 2, head 3, each of which contains transducer 20a, burst amplifier 88, peak detector 90, low and high amplitude detectors 94 and 96, and flow valve 16a. Manual overrides may be provided in such multihead systems, as well as the single-head system shown in FIG. 3, in order to allow the users to completely override the automatic features in case of an emergency.

Other embodiments will occur to those skilled in the art and are within the following claims:

What is claimed is:

1. A receptacle counting system comprising:

ultrasonic sound wave transducer means for emitting ultrasonic sound waves and for receiving ultrasonic sound waves reflected from a receptacle whose content level is to be sensed;

a rim detector, responsive to said reflected ultrasonic sound waves, for determining the location of the rim of the receptacle;

a receptacle detector, responsive to said rim detector, for indicating when a receptacle is present; and means responsive to the receptacle detector, for monitoring the number of receptacles presented to the system.

2. The receptacle counting system of claim 1 in which said transducer means includes a transducer and means for providing a burst of ultrasonic signal to said transducer and in which said rim detector includes a rim detector circuit and a rim counter, said rim counter being enabled to count coincident with said burst of ultrasonic signal and disabled by said rim detector circuit upon determination of the rim's location.

3. The receptacle counting system of claim 2 in which said monitoring means includes a decoder circuit, responsive to said rim counter and said receptacle detector, for indicating the size of the receptacle present.

4. The receptacle counting system of claim 3 in which said mounting means includes means responsive to said decoder circuit for counting the number of receptacles of each size indicating by said decoder circuit.

5. A receptacle counting system comprising:

ultrasonic sound wave transducer means for emitting ultrasonic sound waves and for receiving ultrasonic sound waves reflected from a receptacle whose content level is to be sensed;

a rim detector, responsive to said reflected ultrasonic sound waves, for determining the location of the rim of the receptacle by sensing reflected ultrasonic sound waves having a signal level greater than a reference level;

a receptacle detector, responsive to said rim detector, for indicating when the receptacle is present; and means, responsive to the receptacle detector, for monitoring the number of receptacles presented to the system.

* * * * *